July 11, 1944.   E. PAULICK   2,353,357
FISHOOK RETRIEVER
Filed June 10, 1943
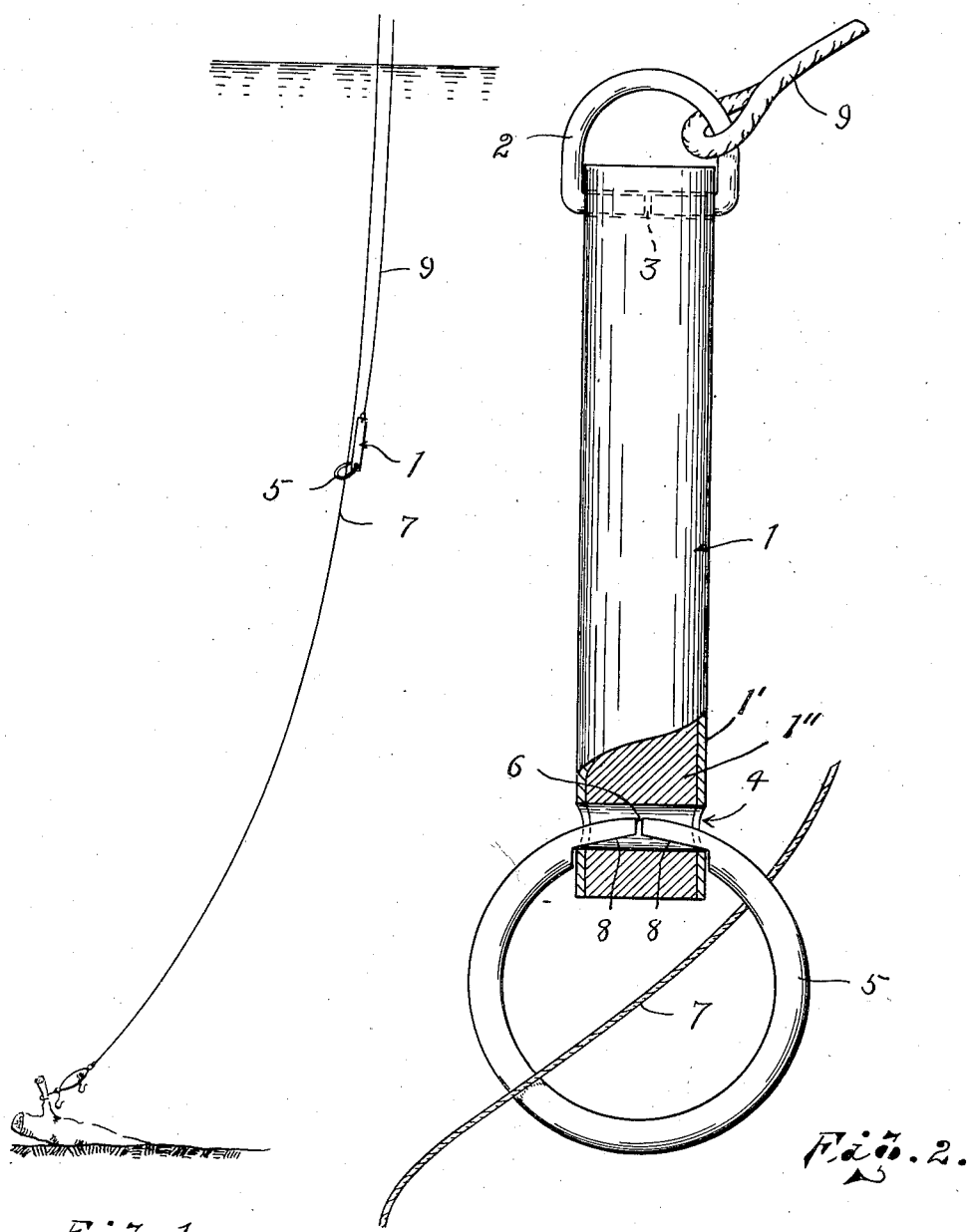
INVENTOR.
Ernest Paulick.
Geo Stevens,
atty.

UNITED STATES PATENT OFFICE 2,353,357

FISHHOOK RETRIEVER

Ernest Paulick, Duluth, Minn.

Application June 10, 1943, Serial No. 490,365

4 Claims. (Cl. 43—30)

This invention relates to a fish hook retriever and has special reference to that type of retriever employing an elongated relatively heavy body portion having a ring mounted in each end thereof, one for suspension and manipulation of the retriever, and the other for optional encirclement of the line being fished with and at the time the hook attached thereto is snagged or caught, on something, under the surface of the water and therefore inaccessible.

The principal object of the instant invention is to provide novel means for a more secure and dependable union of the retriever with the fish line after once being connected therewith in the ordinary way of doing so.

Reference will now be made to the accompanying drawing forming part of this application and in which like reference numerals indicate like parts:

Figure 1 is an illustration of one manner of utilization of the retriever.

Figure 2 is an enlarged elevation of the retriever with a portion of the lower end broken away to more clearly disclose the novel form of line encircling ring.

The reference numeral 1 represents the body portion of the retriever preferably formed of a short piece of pipe 1' filled with lead or other heavy material indicated at 1''. The body portion has a diametrically disposed hole therethrough at each end, the hole at the upper end for the suspending ring 2 is indicated at 3, and the considerably larger one adjacent the lower end is indicated at 4.

Through this larger hole 4 is permanently but loosely threaded the fish line encircling ring 5. This ring is relatively large and split as at 6, with the adjacent ends normally spaced apart sufficiently at least for the convenient reception of the fish line 7, though obviously the ends may be somewhat of a tight fit to insure the security of the line, within said ring.

One salient feature of the instant invention resides in the shaping of the termini of the ring 5 as clearly shown at 8, 8, in Figure 2 of the drawing.

The cut away notches 8, 8, of the inner circumferential surface of the ring are accomplished in a manner to form the opposed relatively long inclined straight converging surfaces, the apex of the angle formed there-between terminating in the split 6 of the ring.

This angular recess in the inner circumferential surface of the ring is formed so as to readily fit over the end edges of the hole 4 in the body portion 1 when so placed therein, thus providing a normally secure positioning of the ring against the fishing line 7 unavoidably finding easy escape therefrom.

This feature is found to materially augment the dependable functioning of the hook retriever and adds materially to the simplicity of such operation.

The tether for the manipulation of the retriever is illustrated at 9 and may be attached thereto in any desired manner.

Having thus described my invention, what I claim and desire to secure by Letters Patent is:

1. The combination with a retriever of the class described including an elongated body portion having a through hole therein adjacent one end and a manipulating tether attached to the other end, of a line receiving ring threaded within said hole said ring having a like angularly shaped notch formed adjacent each end and upon the inner wall thereof for cooperation in holding said ring in a certain predetermined position.

2. In a snagged fish hook retriever including an elongated tethered body portion having a diametrically disposed through hole adjacent one end thereof and a fish line encircling splint ring within said hole having means adjacent the ends thereof for retaining said ends within said hole.

3. In a snagged fish hook retriever including an elongated tethered body portion having a diametrically disposed through hole adjacent one end thereof and a fish line encircling split ring within said hole having spaced notches therein for normally retaining said ring within said hole.

4. Means for biasing a split circular ring within a straight hole in another object consisting of two opposed obtusely shaped notches formed within the inner face of each end of said ring whereby opposed shoulders are provided for registration with the end edges of said hole.

ERNEST PAULICK.